(12) United States Patent
Wischnewskij et al.

(10) Patent No.: US 7,737,605 B2
(45) Date of Patent: Jun. 15, 2010

(54) LINEAR ULTRASOUND MOTOR

(75) Inventors: Wladimir Wischnewskij, Waldbronn (DE); Alexej Wischnewskij, Woerth (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 181 days.

(21) Appl. No.: 11/666,838

(22) PCT Filed: Apr. 13, 2005

(86) PCT No.: PCT/EP2005/003897

§ 371 (c)(1),
(2), (4) Date: Nov. 15, 2007

(87) PCT Pub. No.: WO2006/050759

PCT Pub. Date: May 18, 2006

(65) Prior Publication Data

US 2008/0211348 A1      Sep. 4, 2008

(30) Foreign Application Priority Data

Nov. 15, 2004   (DE) .................. 10 2004 055 082

(51) Int. Cl.
*H02N 2/00* (2006.01)
(52) U.S. Cl. .................. 310/323.09; 310/323.01; 310/323.02; 310/323.08; 310/323.17
(58) Field of Classification Search .............................. 310/323.01–323.04, 323.08, 323.09, 323.16–323.18, 310/328
See application file for complete search history.

(56) References Cited

U.S. PATENT DOCUMENTS

| 4,630,941 | A | * | 12/1986 | Chainer et al. ................. 384/1 |
| 4,672,256 | A | * | 6/1987 | Okuno et al. ................ 310/323 |
| 5,532,540 | A | * | 7/1996 | Claeyssen et al. ............ 310/323 |
| 5,780,956 | A | * | 7/1998 | Oliver et al. ................. 310/323 |
| 5,877,579 | A | * | 3/1999 | Zumeris ................. 310/323.01 |
| 6,188,161 | B1 | * | 2/2001 | Yoshida et al. .............. 310/328 |
| 6,617,759 | B1 | * | 9/2003 | Zumeris et al. ......... 310/323.17 |
| 6,765,335 | B2 | | 7/2004 | Wischnewskiy |
| 6,768,245 | B2 | * | 7/2004 | Mock et al. ............ 310/323.02 |
| 6,774,538 | B2 | * | 8/2004 | Hata .......................... 310/328 |
| 6,979,934 | B1 | | 12/2005 | Wischnewskiy |
| 7,315,108 | B2 | * | 1/2008 | Okamoto et al. ........ 310/323.17 |
| 2008/0169727 | A1 | * | 7/2008 | Yamamoto ............. 310/323.16 |
| 2009/0072665 | A1 | * | 3/2009 | Adachi et al. .......... 310/323.16 |

FOREIGN PATENT DOCUMENTS

| EP | 0755054 | | 1/1997 |
| EP | 1267425 | | 12/2002 |
| JP | 03-027603 | * | 2/1991 |
| JP | 10-80162 | * | 3/1998 |
| JP | 10-80163 | * | 3/1998 |
| WO | WO01/03282 | | 1/2001 |

* cited by examiner

*Primary Examiner*—Thomas M Dougherty
(74) *Attorney, Agent, or Firm*—Gerald T. Bodner

(57) ABSTRACT

The invention relates to an ultrasound linear piezoelectric motor comprising an ultrasound oscillator (1) embodied in the form of a piezoelectric plate (4) or a cylinder shell part (3), acoustic oscillation generators (5) and a friction element (6) which frictionally interacts with a driven element (8) and is disposed in a holder. The inventive holder is embodied in the form of an elastic clamp (13) which embraces a driven element, is fixed to the ultrasound oscillator and made of a sound-conducting material.

14 Claims, 5 Drawing Sheets

LINEAR ULTRASOUND MOTOR

The present invention relates to linear piezoelectric ultrasound motors according to the preamble of patent claim 1. Such motors are intended as drive in various fine positioning apparatus, e.g. for adjusting optical lenses in miniaturized camera objectives, in microscopy tables, for positioning write-read heads in data storage devices and in others of such mechatronic apparatus.

Linear piezoelectric ultrasound motors are known from EP 0 450 919 A1, which operate according to the principle of excitation of a traveling wave in an elliptical resonator (a closed waveguide). The ultrasound oscillator in so constructed motors is made of a non-piezoelectric material. For exciting a traveling bending wave an electromechanical energy converter (piezoelectric element) is adhesively fixed to the resonator. To allow the excitation of a traveling wave in the resonator as effectively as possible it is necessary to provide a best possible acoustic connection between the resonator and the piezoelectric element with respect to the acoustic resistance. That is, the acoustic contact resistance between the piezoelectric element and the resonator must be low. This requires, for example, the use of hard adhesives. A large-area adhesive connection between the piezoelectric ceramics and the resonator material is not possible, however. Due to different thermal expansion coefficients of both materials the ceramic can break out while, in the functional operating mode of piezoelectric ultrasound motors, the adhesive layer becomes soft under the ultrasonic influence which leads to an increased acoustic resistance and, as a consequence, to increased power losses. The side of the resonator interacting with the rotor is provided with milled teeth or ribs serving the amplification of the tangential component of the bending wave. Such milled portions are not producible at low costs either.

Accordingly, the prior motors include constructively complicated ring oscillators and are not suited for miniaturization and cost-efficient mass production.

Moreover, linear ultrasound motors are known from U.S. Pat. No. 5,672,930, which utilize the excitation of a traveling ultrasonic wave in a rod oscillator (in an open waveguide). The disadvantage of such motors resides in the fact that it is practically impossible to excite a neatly traveling ultrasonic wave in an open waveguide because a symmetrical standing wave is excited in an open waveguide simultaneously with the excitation of a traveling wave, which negatively affects the effective functioning of the frictional contact of the motor. This results in a strong heating of the frictional contact and the ultrasound motor itself, respectively, as well as in a high noise level. Moreover, these motors need a high excitation voltage, are likewise expensive to manufacture and cannot be miniaturized.

The most obvious solution is represented by linear piezoelectric ultrasound motors according to DE 199 45 042 C2. With these ultrasound motors, a standing longitudinal wave as well as a bending wave are excited in the piezoelectric plate-like resonator at the same time. As a result of the interference of both waves the push element mounted on the resonator undergoes an elliptical movement, thereby transferring the movement to a mobile element which is pressed against the push element and supported by ball-bearings. However, the use of a relatively expensive ball-bearing in this construction is disadvantageous. The use of a slide bearing involves friction losses in the bearing comparable with the turning force developed by the actuator or transmitted through the frictional contact, respectively. The necessary use of ball bearings renders the motors more complicated, increases their construction space and their production costs. Furthermore, it is not possible to employ such motors for non-magnetic applications if steel ball bearings are used.

The invention is therefore based on the object to reduce the physical size of linear ultrasound motors and to increase their efficiency.

The solution to the object of the invention is achieved with the combination of features defined in patent claim 1.

The invention is based on a linear piezoelectric ultrasound motor having a linear sliding/frictional contact between the driven element and its holder, which allows the excitation of ultrasonic oscillations in the holder of the driven element, with the friction between the driven element and the holder being reduced.

In a linear piezoelectric ultrasound motor comprising an ultrasound oscillator embodied in the form of a piezoelectric plate or a cylinder part with acoustic oscillation generators and a friction element which frictionally interacts with the driven element and is disposed in a holder, the aforementioned holder is embodied in the form of at least one elastic clamp which embraces the driven element. This clamp is fixed to the ultrasound oscillator and is made of a sound-conducting material.

Due to the fact that the holder of the driven element is fixed to the ultrasound oscillator and is made of a sound-conducting material ultrasonic oscillations generated by the ultrasound oscillator are intensively co-excited in the holder and are passed therethrough. The presence of ultrasonic oscillations in the holder allows a reduction of the friction force between the driven element and the holder and, by this, of the use of linear ball bearings which would otherwise be required. This facilitates the construction, reduces the physical size and the production costs for the motor.

In various constructive embodiments of the motor the clamp may be made of a metal wire having a round cross-section or of a metal strip having a rectangular cross-section. This allows for a better matching of the acoustic resistance of the clamp to the ultrasound oscillator as well as an exact adjustment of the contact force of the driven element to the oscillator of the motor.

In other alternative motors the driven element can, moreover, be made in the form of a rectangular, triangular, round or half-round rod with a flat surface.

This allows the utilization of different production technologies of the driven element and, thus, the achievement of the necessary production precision for the respective application.

In another embodiment of the ultrasound motor according to the invention the driven element may be embodied as a stationary guide rail with respect to which the ultrasound oscillator with the holder fixed to the same is displaceable.

This extends the field of application of the inventive motor because the motor can be designed in the form of a carriage which is movable along a guide rail.

The invention will be explained in more detail below by means of exemplary embodiments and with reference to the figures.

Figure 4:
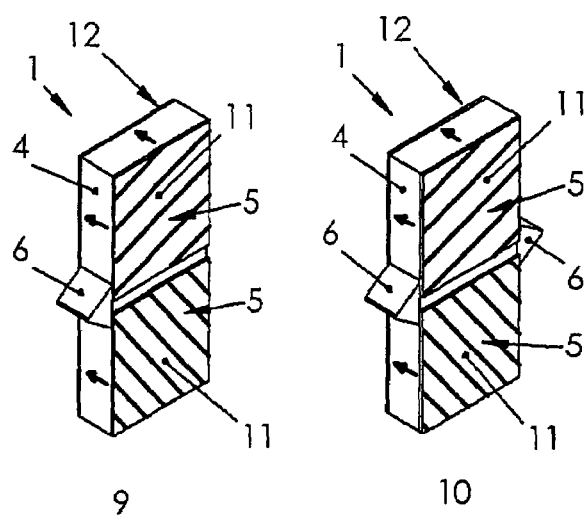
Figure 5:
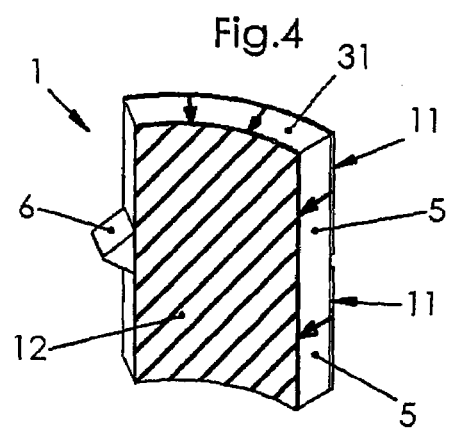
Figure 6:
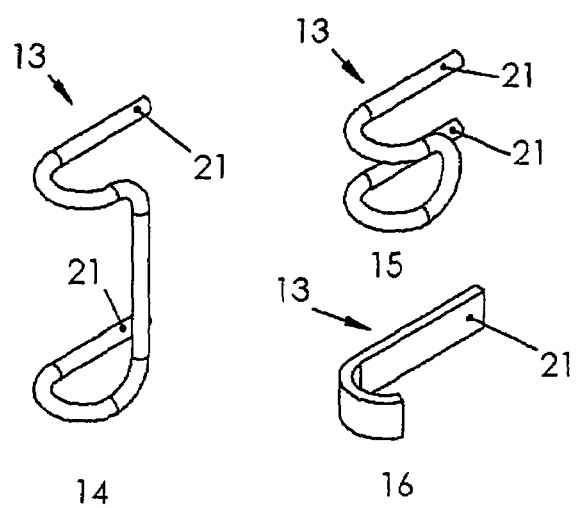
Figure 7:
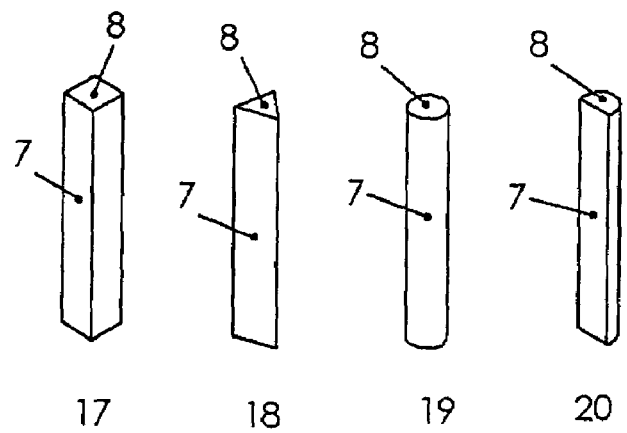
Figure 8:
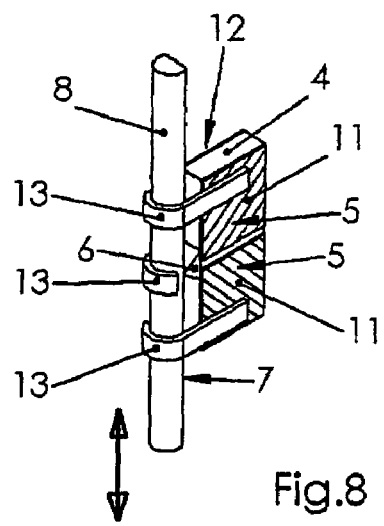
Figure 9:
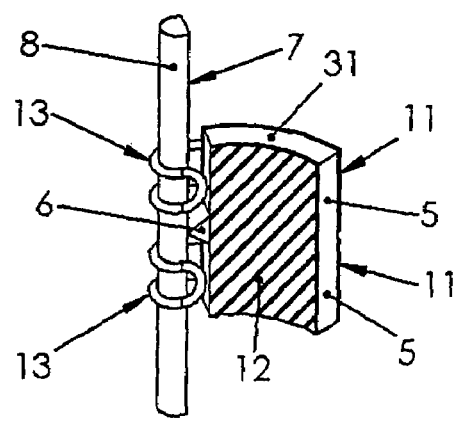
Figure 10:
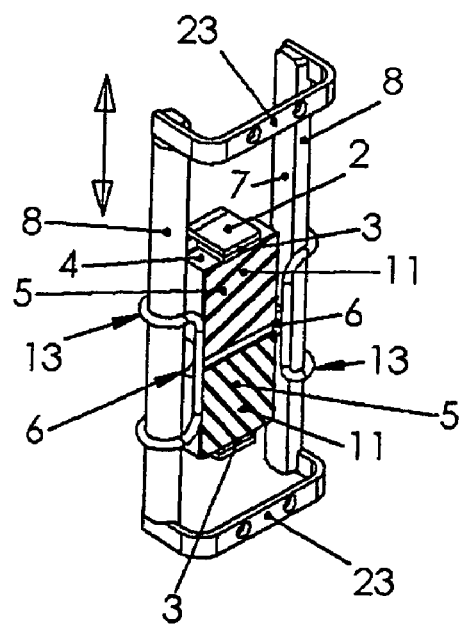
Figure 11:
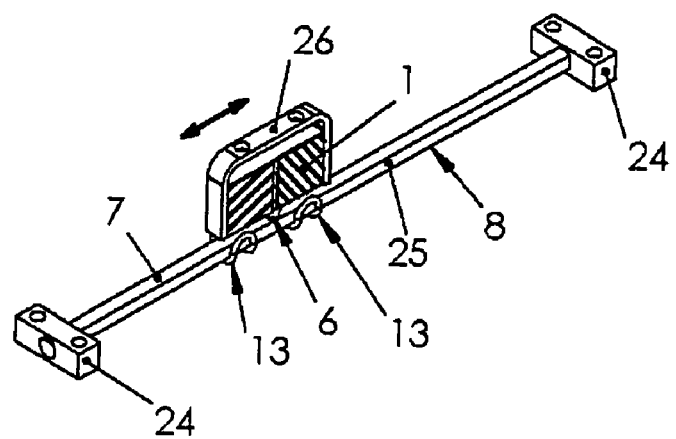
Figure 12:
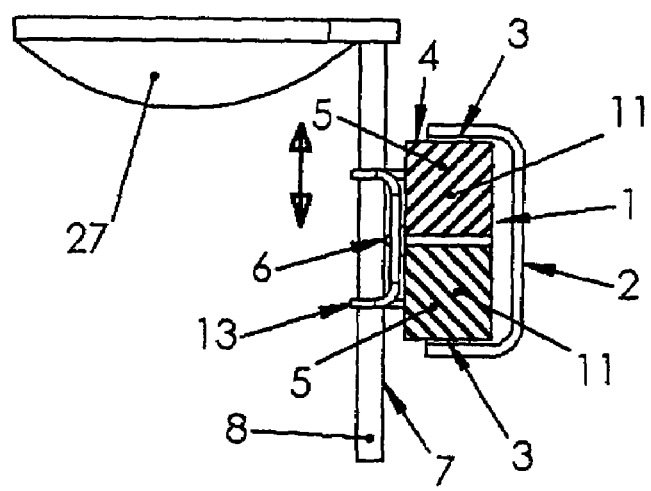
Figure 13:
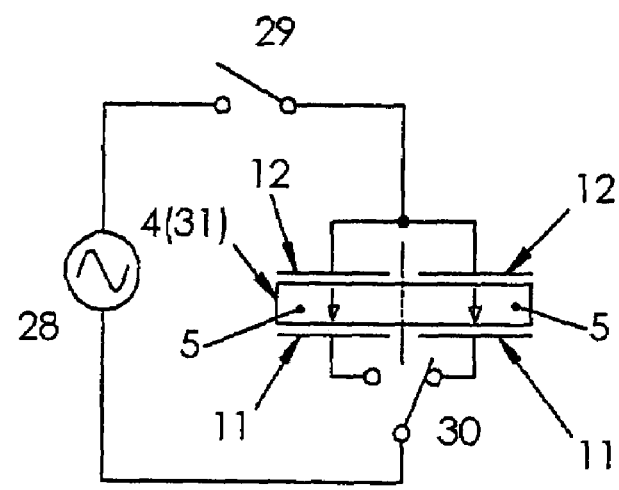

FIG. 4 shows a first oscillator alternative in the form of a piezoelectric plate FIG. 5 shows a second oscillator alternative in the form of a cylinder shell part FIG. 6 shows alternative embodiments of the oscillator holder FIG. 7 shows alternatives of the driven element FIG. 8 shows an ultrasound motor with holders made of the metal strip FIG. 9 shows a motor with an oscillator in the form of a cylinder shell part FIG. 10 shows a motor with two driven elements FIG. 11 shows a motor with stationary driven elements FIG. 12 shows an exemplary application of the motor according to the invention and FIG. 13 shows the electrical wiring of the motor according to the invention.

Figure 1:
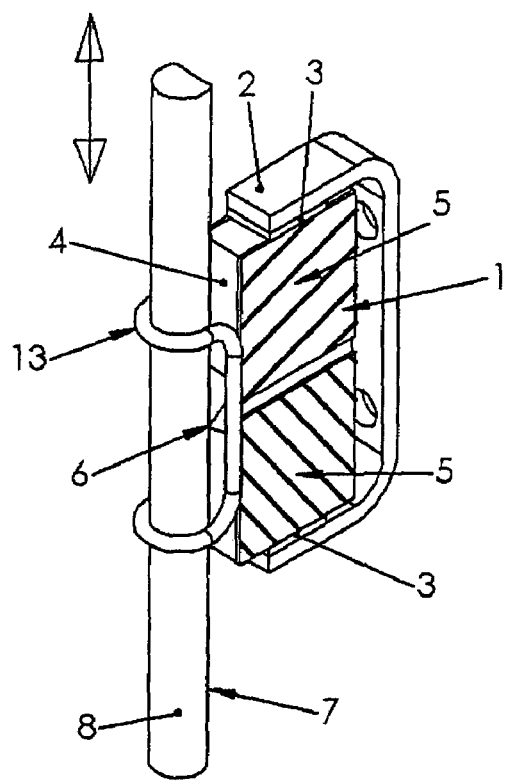
FIG. 1 shows a perspective view of an embodiment of the ultrasound motor

The ultrasound motor according to the invention as illustrated in FIG. 1, 2, 3 is comprised of the ultrasound oscillator 1 which is mounted on sound-conducting supports 3 in a carrier 2. The ultrasound oscillator 1 is embodied, for example, as a piezoelectric plate 4 which includes the acoustic oscillation generators 5. The friction element 6, which frictionally interacts with friction surface 7 of the driven element 8, is mounted at or on the piezoelectric plate 4.

According to various alternatives of the inventive motor one, two or more friction elements 6 can be disposed on the piezoelectric plate 4, which can be seen in FIG. 4, Pos. 9 or 10.

The oscillator 1 can be embodied as a cylinder shell part 31 with generators 5 mounted thereon, as well as with one or two friction elements 6, which is shown in FIG. 5.

The acoustic oscillation generators 5 are comprised of an excitation electrode 11, a common electrode 12 and the piezoelectric ceramics of plate 4 placed therebetween.

The driven element 8 is mounted in the specific holder 13 which is embodied in the form of a clamp or bow embracing this element (see FIG. 6).

The clamp 13 is made of a sound-conducting material, e.g. of a metal wire, a metal strip having a round or rectangular cross-section (FIG. 6, Pos. 14, 15, 16). For example, temperature-treated steel or bronze can be used as material for the holder 13.

The driven element 8 can have the shape of a rod with the rectangular, triangular, round, half-round cross-section with a planar surface, which is shown in FIG. 7, Pos. 17, 18, 19, 20. Either metal or ceramics can be used as material for the driven element, e.g. temperature-treated carbon steel, aluminum oxide, zirconium oxide, silicon nitride or the like materials.

Figures 2, 3:
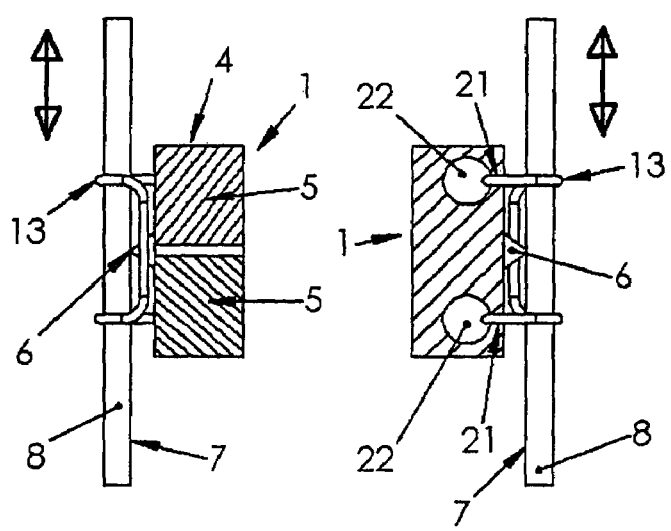
FIG. 2, 3 show lateral views of the motor

The holder 13 is firmly attached at or on the surface of the oscillator plate 4. To this end, the ends 21 (FIG. 6) of the holder 13 are fixed to the electrodes 11, 12 in an adhesive manner by welding (FIG. 3) or gluing (FIG. 8) with a solid epoxy adhesive.

FIG. 9 illustrates an ultrasound motor according to the invention comprising an oscillator 1 in the form of a cylinder shell part 31.

FIG. 10 shows an alternative construction of the motor according to the invention comprising two driven elements 8, which are connected to each other by a mechanical bridge 23.

In yet another alternative embodiment of the motor (see FIG. 11) the driven element 8 can be mounted by means of holders 24 in a stationary manner with respect to the housing of the device (not shown). According to this alternative, the driven element is embodied in the form of a guide rail 25. The oscillator 1 with the holder 26, on which the element to be moved is attached (not shown), are, in this case, mounted to be movable with respect to the guide rail.

In another alternative construction of the motor an optical lens 27 is mounted on the driven element 8 (see FIG. 12) so as to provide an autofocussing means, e.g. for a mobile photo phone.

FIG. 11 shows an electrical wiring scheme of the motor according to the invention comprising the electric excitation source 28. The circuit comprises a switch 29 for cutting off the supply voltage and a switch 30 for reversing the moving direction of the driven element.

The ultrasound motor according to the invention as illustrated operates as follows.

When the switch 29 (FIG. 13) is actuated, the electrodes 11, 12 of the acoustic oscillation generator 5 are supplied with an electric alternating voltage from the electric excitation source 28. The frequency of the alternating voltage thereby corresponds to the working frequency of the oscillator 1. The excitation voltage excites the generator 5 so that an acoustic standing wave is generated in the oscillator. The push element 6, which is mounted on the long front face of the oscillator and pressed against the friction surface 7, starts to oscillate thereby causing the driven element 8 to move. The path of motion of the push element may be in the form of an ellipse, a circle or a straight line forming an angle to the front face. The form of the path of motion depends on the geometrical dimensions of the oscillator which, in turn, define the type of the excited standing wave.

Points located on the surfaces of the electrodes 11, 12 oscillate with the same amplitudes as the points of the oscillator plate 4 located underneath. Thus, high-frequency oscillations also propagate in the holder 13 fixed to the electrodes 11, 12 (see FIG. 1 to 3). As the holder 13 is made of a sound-conducting material it acts as a waveguide for ultrasound. Due to the specifically bent shape of the holder (see FIG. 6) both longitudinal and bending oscillations are present in the same. Moreover, an amplification of the oscillation amplitude of the holder takes place owing to the step-like junction between the oscillator 1 and the holder 13. The oscillation of the holder 13 results in a reduction of friction losses between the same and the driven element.

In the alternatives of the motor with two friction elements, two driven elements 8 and two holders (FIG. 10) (FIG. 4, Pos. 10) such a reduction of the friction force occurs in both holders.

Different embodiments of the driven elements can be employed in the motor according to the invention. Some exemplary embodiments are illustrated in FIG. 7.

The embodiment of the oscillator 1 in the form of a cylinder shell part (FIG. 5, FIG. 9) facilitates the use of the inventive motor in devices having a cylindrical shape, e.g. in objectives.

The embodiment of the driven element 8 in the form of a guide rail 25 allows the construction of the motor as a mobile slide, illustrated in FIG. 10.

The use of the motor according to the invention in an objective (FIG. 10) or another optical device of this type with multiple adjustable lenses allows a radial arrangement of every single motor along the common axis. This facilitates the entire construction and reduces the physical size of the device.

A production of the holder 13, for example, of beryllium bronze and of the driven element 8 of aluminum oxide allows the construction of a non-magnetic linear motor.

Functional tests of the motor according to the invention were carried out on several prototypes. Thus, an ultrasound motor having a diameter of 0.5 mm was fabricated, with the oscillator 1 having geometrical dimensions of 18×8×3 mm$^3$ and comprising a holder 13 made of beryllium bronze. As driven element 8 a rod made of hardened steel and having a diameter of 3 mm was used. A specifically developed excitation source 28 with an electric alternating voltage of 3.6 V was used for the excitation. The current drawn from the motor amounted to 0.15 mA. During the functional tests the motor demonstrated a functional period of 660000 movement cycles with a travel of 20 mm. According to an extrapolation the functional period would imply a lifetime of approximately 18 years.

LIST OF REFERENCE NUMERALS 1 ultrasound oscillator
2 carrier
3 sound-insulating supports
4 piezoelectric plate
5 acoustic oscillation generator
6 friction element
7 friction surface of driven element
8 driven element
9 illustration explanatory of the construction of the oscillator 1
10 illustration explanatory of the construction of the oscillator 1
11 excitation electrode
12 common electrode
13 holder of driven element 8
14 alternative construction of holder 13
15 alternative construction of holder 13
16 alternative construction of holder 13
17 alternative construction of driven element 8
18 alternative construction of driven element 8
19 alternative construction of driven element 8
20 alternative construction of driven element 8
21 ends of holder 13
22 soft solder drops
23 elastic bridge
24 holder of guide rail 25
25 guide rail
26 holder of mobile element
27 optical lens
28 source of electric excitation
29 switch
30 reversing switch for moving direction
31 cylinder shell part

The invention claimed is:

1. A linear piezoelectric ultrasound motor, comprising an ultrasound oscillator in the form of a piezoelectric plate or a cylinder shell part of a piezoelectric element and generators for generating acoustic oscillations and a friction element frictionally interacting with the driven element, wherein
the driven element is embraced by a holder in the form of at least one elastic clamp or bow, wherein ends of the holder are fixed to the ultrasound oscillator in an adhesive manner and the holder is made of a sound-conducting material.

2. The linear ultrasound motor according to claim 1, wherein
the holder is made of a metal wire having a round cross-section or of a metal strip having a rectangular cross-section.

3. The linear ultrasound motor according to claim 1, wherein
the driven element has the form of a rod with a rectangular, triangular, round or half-round cross-section and a plane friction surface.

4. The linear ultrasound motor according to claim 1, wherein
the driven element is a stationary guiding element with respect to which the ultrasound oscillator with the holder fixed to the same is moved.

5. The linear ultrasound motor according to claim 2, wherein
the driven element has the form of a rod with a rectangular, triangular, round or half-round cross-section and a plane friction surface.

6. The linear ultrasound motor according to claim 2, wherein
the driven element is a stationary guiding element with respect to which the ultrasound oscillator with the holder fixed to the same is moved.

7. The linear ultrasound motor according to claim 3, wherein
the driven element is a stationary guiding element with respect to which the ultrasound oscillator with the holder fixed to the same is moved.

8. A linear piezoelectric ultrasound motor, comprising:
a piezoelectric element that generates ultrasonic oscillations, said piezoelectric element having a first major face, a second major face opposite said first major face and a first minor face, said first minor face having a friction element thereon;
a first electrode contacting a first region of said first major face;
a second electrode contacting said second major face at a region opposite at least a portion of said first region;
a driven element having a generally rod-like shape; and
a fastening element that presses said driven element against said friction element, wherein
said fastening element is fastened to at least one of said first electrode and said second electrode.

9. The linear piezoelectric ultrasound motor of claim 8, wherein said fastening element at least partially encompasses said driven element.

10. The linear piezoelectric ultrasound motor of claim 8, wherein said fastening element is hook-shaped.

11. The linear piezoelectric ultrasound motor of claim 8, wherein said fastening element is made of a sound-conducting material and elastically presses said driven element against said friction element.

12. The linear piezoelectric ultrasound motor of claim 8, comprising a third electrode that contacts a second region of said first major face, said third electrode being spaced from said first electrode.

13. The linear ultrasound motor according to claim 1, wherein, during operation of the linear ultrasound motor, both longitudinal and bending oscillations are present within the holder.

14. The linear piezo electric ultrasound motor of claim 10, wherein, during operation of the linear ultrasound motor, both longitudinal and bending oscillations are present within the fastening element.

* * * * *